(No Model.) 2 Sheets—Sheet 1.

G. W. CUSHING.
STOCK CAR.

No. 429,509. Patented June 3, 1890.

WITNESSES:
R H Whittlesey
F. E Gaither

INVENTOR,
Geo. W. Cushing,
by J. Snowden Bell,
Att'y.

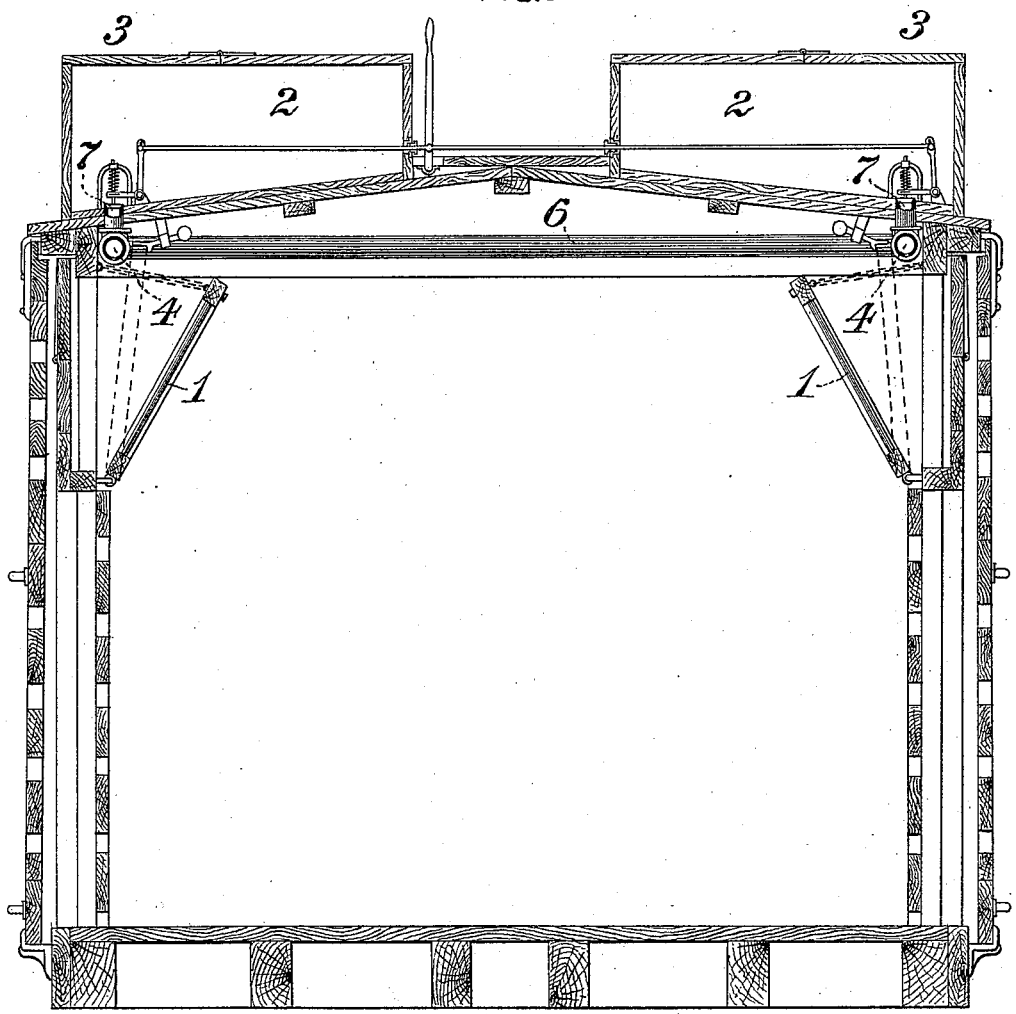

UNITED STATES PATENT OFFICE.

GEORGE W. CUSHING, OF OMAHA, NEBRASKA.

STOCK-CAR.

SPECIFICATION forming part of Letters Patent No. 429,509, dated June 3, 1890.

Application filed December 21, 1889. Serial No. 334,473. (No model.)

*To all whom it may concern:*

Be it known that I, GEORGE W. CUSHING, of Omaha, in the county of Douglas and State of Nebraska, have invented a certain new and useful Improvement in Stock-Cars, of which improvement the following is a specification.

My invention relates to stock-cars of the class in which provision is made for feeding the animals while in transit from racks located in the car, and is more particularly designed for application in territory where the climate is ordinarily warm and dry, for the purpose of preventing excessive thirst being excited in the animals from feeding upon hay which has become unduly dry and crisp.

To this end my invention consists in the combination, with a stock-car, of a hay-rack, a water-supply tank located above the same, and a perforated sprinkler-pipe extending above the hay-rack and communicating with the supply-tank.

The improvement claimed is hereinafter fully set forth.

Figure 1:
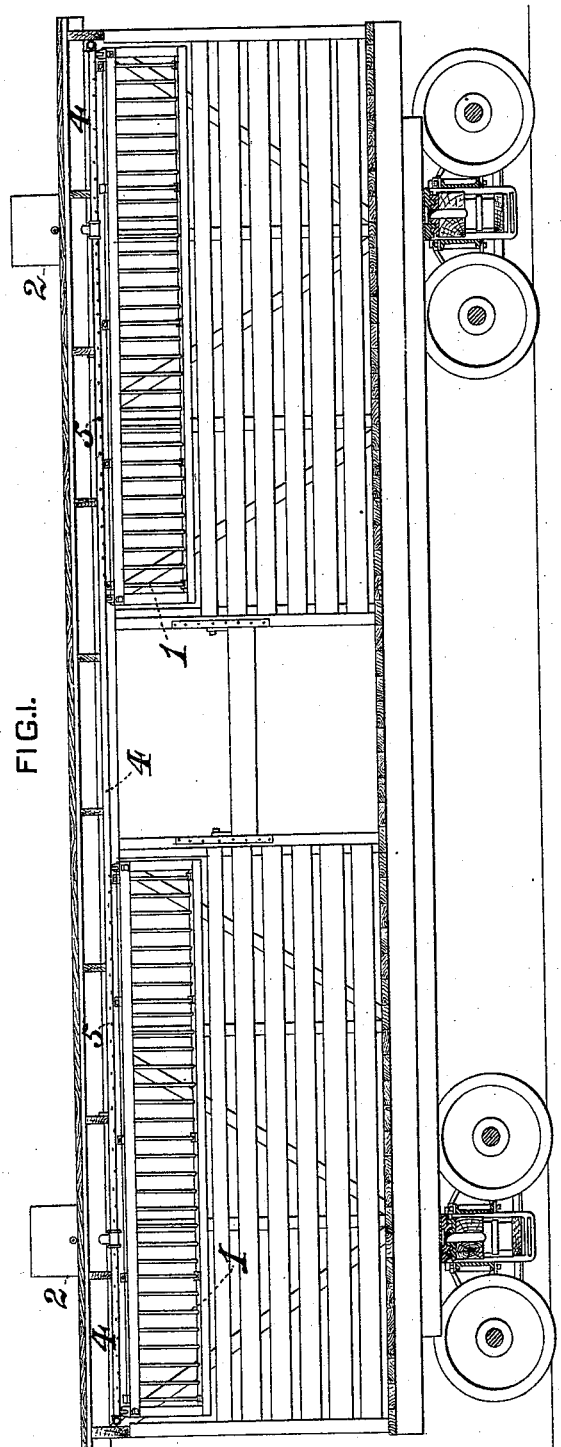
Figure 2:
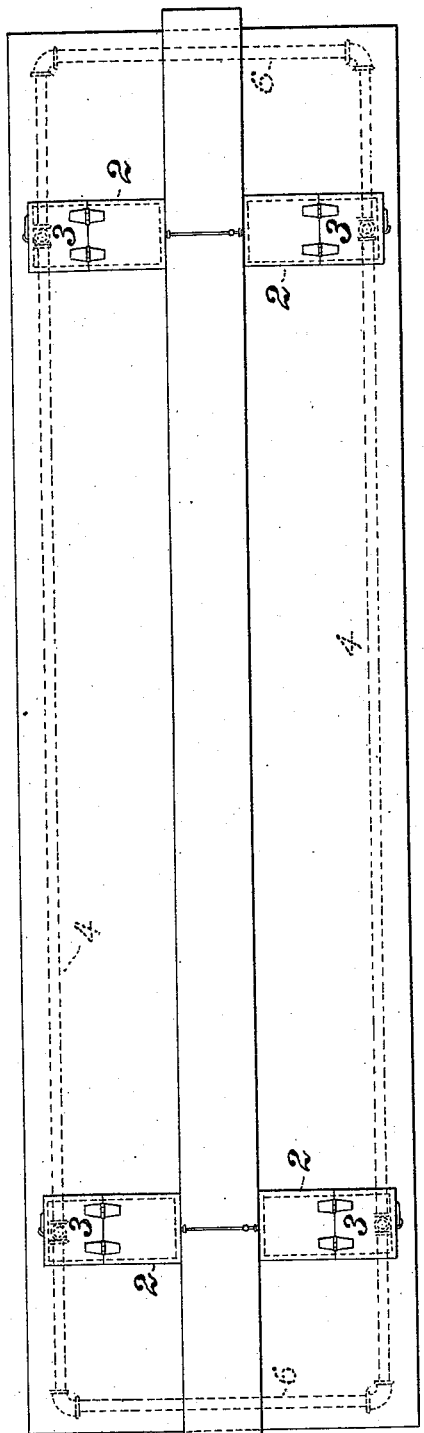

In the accompanying drawings, Figure 1 is a vertical longitudinal central section through a stock-car embodying my invention; Fig. 2, a plan or top view of the same, and Fig. 3 a transverse section on an enlarged scale through the same.

My invention is herein illustrated as applied in a stock-car the body of which is of the ordinary standard construction, and is provided with a series of hay-racks 1, extending longitudinally along its sides, the racks being pivoted thereto at bottom and suspended at top by chains, so as to either stand in an inclined position, as shown, to receive a supply of hay and permit the access of the animals in the car thereto, or to be raised and held by latches close to the side of the car when not in use. In the instance shown two hay-racks are located on each side of the car, each rack extending from one end of the car nearly to a door at its center; but a single rack extending continuously along each side might be employed with doors placed at or near the ends.

In the practice of my invention I provide one or more water-supply tanks 2, which are supported upon the roof-carlings, a series of tanks, as in this case four, being preferable, as affording a better distribution of weight and avoiding interference with the running-board. The tanks 2 are provided with top openings, closed by suitable hinged lids or caps 3, to enable them to be supplied from water-station tanks or hydrants by means of hose, and may, if desired, be connected one with the other by pipes, so as to be simultaneously filled.

In cases where the car is fitted with watering-troughs for furnishing drinking-water to the animals the tanks should be made of sufficient capacity to serve for supplying said troughs in addition to their prime function in my present invention—*i. e.*, furnishing water for moistening the feed.

A series of horizontal sprinkler-pipes 4, each of which is perforated with a series of small openings 5 in its lower portion, is supported above the hay-racks 1, one of said sprinkler-pipes extending throughout the length of each hay-rack, in order to spray or sprinkle water thereinto, and being set at about the center thereof. The sprinkler-pipes are connected by short vertical pipes with the water-supply tanks 2, the connecting-pipes being provided with suitable cocks or valves 7, so that water from the tanks may be admitted to or shut off from the sprinkler-pipes, as may from time to time be necessary. The handles of the regulating-cocks 7 may be connected with a single operating-lever adapted to be worked from above the roof of the car, so that all the cocks may be simultaneously opened and closed. In the construction shown a single sprinkler-pipe extends continuously along each side of the car, the two side pipes being connected at their ends by transverse pipes 6, thus forming a continuous channel. It will, however, be obvious that independent sections, each located above and of corresponding length to one of the hay-racks, may be substituted, if preferred.

The application of my improvement can be made at a trifling cost and without involving interference with the location or operation of the feeding and watering appliances, or occupying any space in the car which would be otherwise available. The facility which it affords of readily and quickly moistening dry hay to a degree proper to make it healthful and acceptable to the animals is of material advantage in the numerous instances in which the character of the climate is such as to make the condition of the hay undesirable to attain the best results in keeping the animals in good condition.

I claim as my invention and desire to secure by Letters Patent—

1. In a stock-car, a hay-rack, a water-supply tank located above said rack, and a perforated sprinkler-pipe placed above and extending longitudinally of the rack and communicating with the supply-tank, combined with a vertical pipe having a valve or cock opening into the tank and operated by a lever to admit water from the tank to the sprinkler-pipe, substantially as set forth.

2. In a stock-car, the combination of a series of water-tanks, one in each upper corner of the car, whereby weight is the better distributed and interference with the running-board avoided, an endless system of sprinkler-pipes connecting the several tanks with each other, hay-racks adapted to receive water from the sprinkler-pipes, valves placed between the tanks and the sprinkler-pipes, and mechanism for operating said valves, whereby water may be admitted from the tanks to the sprinkler-pipes or shut off therefrom, substantially as set forth.

GEORGE W. CUSHING.

Witnesses:
   GEORGE R. BUTLIN,
   L. T. LITTON.